United States Patent [19]
Hill

[11] Patent Number: 5,226,671
[45] Date of Patent: Jul. 13, 1993

[54] AIR BAG STRUCTURE AND METHOD OF FORMING

[75] Inventor: Bruce R. Hill, Mesa, Ariz.

[73] Assignee: TRW Inc., Lyndhurst, Ohio

[21] Appl. No.: 779,536

[22] Filed: Oct. 17, 1991

[51] Int. Cl.$^5$ ............................................. B60R 22/16
[52] U.S. Cl. ................................................... 280/743
[58] Field of Search ............... 280/743, 729, 736, 742, 280/737

[56] References Cited

U.S. PATENT DOCUMENTS

| | | | |
|---|---|---|---|
| 3,430,843 | 3/1969 | Fesco | 229/62.5 |
| 3,616,622 | 11/1971 | Friedman | 55/376 |
| 3,724,179 | 4/1973 | Leinfelt | 55/367 |
| 3,814,458 | 6/1974 | Acs | 280/150 AB |
| 3,929,350 | 12/1975 | Pech | 280/150 AB |
| 3,937,258 | 2/1976 | Loomba | 141/67 |
| 4,004,827 | 1/1977 | Kondo et al. | 280/742 |
| 4,153,273 | 5/1979 | Risko | 280/740 |
| 4,169,613 | 10/1979 | Barnett | 280/732 |
| 4,183,550 | 1/1980 | Sudou | 280/743 |
| 4,205,811 | 6/1980 | Palm et al. | 244/100 |
| 4,793,631 | 12/1988 | Takada | 280/743 |
| 4,817,828 | 4/1989 | Goetz | 222/3 |
| 4,830,401 | 5/1989 | Honda | 280/743 |
| 4,887,842 | 12/1989 | Sato | 280/730 |
| 4,921,735 | 5/1990 | Bloch | 428/34.9 |
| 4,988,119 | 1/1991 | Hartmeyer | 280/743 |
| 5,071,161 | 12/1991 | Mahon et al. | 280/743 |

OTHER PUBLICATIONS

General Motors Driver Air Cushion Restraint System, Louckes, et al., pp. 183-199, May, 1973.

*Primary Examiner*—Tamara L. Graysay
*Attorney, Agent, or Firm*—Calfee, Halter & Griswold

[57] ABSTRACT

An inflatable vehicle air bag is formed of flexible material. A fluid inlet opening is defined by a base portion of the flexible material which circumscribes a central axis. A plurality of deflectable flaps and a plurality of mounting holes are formed in the flexible material. The mounting holes are located radially outward from the deflectable flaps. Segments of reinforcement and resistant materials overlie the gas inlet opening and are secured to the flexible air bag material by concentric seams which surround the central axis. The segments of reinforcement and heat resistant materials have mounting holes located between the concentric seams and aligned with the mounting holes in the air bag material. Moreover, the segments of reinforcement and heat resistant materials form deflectable portions which overlie the deflectable flaps of the flexible air bag material. The air bag is adapted to be secured to a structural part of an occupant restraint system by fasteners (e.g., bolts, rivets) which extend through the mounting holes. The configuration of the fluid inlet opening, the location of the mounting holes, and the reinforcement and heat resistant materials combine to redirect fluid from the inflator into the air bag and to resist tearing of the air bag away from the occupant restraint system under the heat and pressures which are applied to the air bag during its deployment.

41 Claims, 7 Drawing Sheets

AIR BAG STRUCTURE AND METHOD OF FORMING

TECHNICAL FIELD

The present invention relates to an inflatable air bag and to a method of forming the air bag. In particular, the present invention relates to a new way of forming a fluid inlet opening in an air bag and to new structure for (i) mounting the air bag in an occupant restraint system, and (ii) resisting forces which tend to tear the air bag away from the remainder of the occupant restraint system during deployment of the air bag.

BACKGROUND OF THE INVENTION

A typical vehicle occupant restraint system comprises a container, an inflatable air bag disposed in the container, and an inflator in proximity to the inflatable air bag. The inflatable air bag is commonly formed of flexible fabric material such as nylon, and is generally stored in the container in a collapsed, folded condition. The air bag has a fluid inlet opening through which fluid (e.g., gas) under pressure can be directed into the air bag. The perimeter of the fluid inlet opening (often referred to as the "mouth" of the air bag) is attached to the container and/or the inflator.

At the onset of a collision, the inflator is actuated and rapidly directs an inert, non-toxic gas (e.g., nitrogen) into the fluid inlet opening in the air bag. The gas forces the air bag out of the container and rapidly inflates the air bag to a predetermined configuration. When inflated to its predetermined configuration, the air bag cushions a vehicle occupant against impact with a structural part of the vehicle In the construction of an air bag, one of the fundamental considerations is the design of the mouth of the air bag. The mouth of the air bag must provide a fluid inlet opening and a means whereby the air bag can be attached to the container and/or inflator.

One known type of design for the mouth of an air bag is disclosed in Goetz U.S. Pat. No. 4,817,828. The air bag fabric is formed into tubes at the perimeter of the fluid inlet opening A series of rigid retaining bars are disposed in the fabric tubes to complete the mouth of the air bag. The air bag is attached by fasteners to a reaction can that is part of a container for the air bag. The fasteners secure the retaining bars to the reaction can with part of each fabric tube captured between the reaction can and a retaining bar. The retaining bars distribute forces on the air bag material and thereby help it resist being torn away from the reaction can during deployment of the air bag.

Another known type of design for the mouth of an air bag is disclosed in U.S. Pat. No. 4,183,550. The fluid inlet opening is a generally circular opening in the air bag fabric. The opening has a diameter smaller than the outside diameter of an inflator designed to be inserted into the air bag. An inner portion of the bag material about the opening has radial slits and extends inwardly of a retainer which is used to mount the air bag in an occupant restraint system. The structure allegedly (i) enables the inflator to be inserted into the opening in the bag material, and (ii) increases the shear resistance of the air bag material in the area of the air bag surrounding the inflator.

Both of the foregoing patents disclose mounting structure for the mouth of an air bag designed to resist tearing of the air bag away from the remainder of an occupant restraint system during deployment of the air bag. Typically, in vehicle occupant restraint systems incorporating a pyrotechnic inflator, such as in the preferred embodiments of the Goetz '828 patent, the mouth of the air bag is spaced outward from the inflator. That spacing provides some protection against the heat of the inflator (or of the gases generated by the inflator during its operation). Additionally, it is known to coat the fabric of an air bag material with a heat resistant material, to provide further heat protection to the air bag fabric.

In the air bag system shown in the '550 patent, which also incorporates a pyrotechnic inflator, the inner ends of the air bag lie directly against the inflator. Moreover, the gas outlet holes in the inflator are uncovered and are located so that gas directed from the holes can impinge directly on the mouth of the air bag. Thus, there is a risk that the heat of the inflator or the gas directed from the inflator may burn or melt the mouth of the air bag. When weakened by burning or melting, the mouth of the bag may tear away from its fasteners under the pressure of deployment of the air bag.

As vehicle restraint systems become more compact, the air bag is necessarily located nearer the inflator. Thus, the need to provide air bag designs which resist both the heat and pressure of deployment becomes particularly important. Moreover, since inflatable air bags are being installed in more vehicles, the need to efficiently produce such air bags and to incorporate them efficiently into occupant restraint systems is becoming increasingly important.

SUMMARY OF THE PRESENT INVENTION

The present invention relates to a new way of forming a fluid inlet opening in a vehicle air bag. The air bag is designed to be simple and efficient to construct and to incorporate into an occupant restraint system, by mass production techniques. Moreover, the air bag is specially designed to resist being torn away from the occupant restraint system under the heat and pressure which are applied to the air bag during its deployment.

According to the invention, an air bag is formed of a flexible material (e.g., a flexible nylon fabric). The fluid inlet opening is defined by a base portion of the flexible material which surrounds a central axis. A plurality of deflectable flaps are formed from the flexible material and extend inward from the base portion and toward the central axis. The flaps are deflectable radially outward with respect to the central axis when fluid is directed against the flaps and into the air bag. A plurality of mounting holes are formed in the flexible material and are located radially outward of the deflectable flaps.

According to one preferred embodiment of the present invention, the air bag is formed by flexible front and rear panels which are joined together along a peripheral seam. The deflectable flaps are formed by cutting slits in the rear panel, before the panels are joined together. The slits intersect at a point which lies along the central axis of the fluid inlet opening. The mounting holes are located so that each mounting hole is disposed outward from and about equidistant from the edges of a respective one of the deflectable flaps. The mounting holes are cut in the rear panel, simultaneously with cutting the slits.

According to other embodiments of the present invention, the deflectable flaps are located at specific sites about the central axis of the fluid inlet opening and the remainder of the fluid inlet opening has an inner edge, with a predetermined configuration. The mounting holes are disposed outward of the deflectable flaps. The deflectable flaps, the remainder of the fluid inlet opening and the mounting holes are simultaneously formed (preferably cut) in the flexible fabric forming the rear panel of the air bag.

Still further, according to the preferred embodiment, a segment of flexible reinforcement material and a segment of flexible heat resistant material are secured to opposite sides of the rear panel by means of concentric seams which surround the central axis. The segments of reinforcement and heat resistant materials have mounting holes which are disposed between two of the concentric seams and are aligned with the mounting holes in the flexible air bag material. Moreover, the segments of reinforcement and heat resistant materials have fluid inlet openings formed at the same time and in the same geometric pattern as the fluid inlet opening in the rear panel. The configuration of the fluid inlet opening is designed to produce a certain resistance to the air bag being torn away from the occupant restraint system. Additionally, the segments of reinforcement and heat resistant materials and the concentric seams surrounding the mounting holes increase the physical resistance of the air bag to being torn away from the occupant restraint system. Still further, the segment of heat resistant material redirects gas directed from the inflator, and shields the rear panel, the mounting holes and the concentric seams from heat damage from the gases generated by the inflator during deployment of the air bag. Thus, the configuration of the fluid inlet opening, the location of the mounting holes, and the segments of reinforcement and heat resistant materials combine to resist the air bag from being torn away from the occupant restraint system during deployment of the air bag.

These and other features of the present invention will become further apparent from the following detailed description and the accompanying drawings.

DETAILED DESCRIPTION OF THE PREFERRED EMBODIMENT

Figure 1:
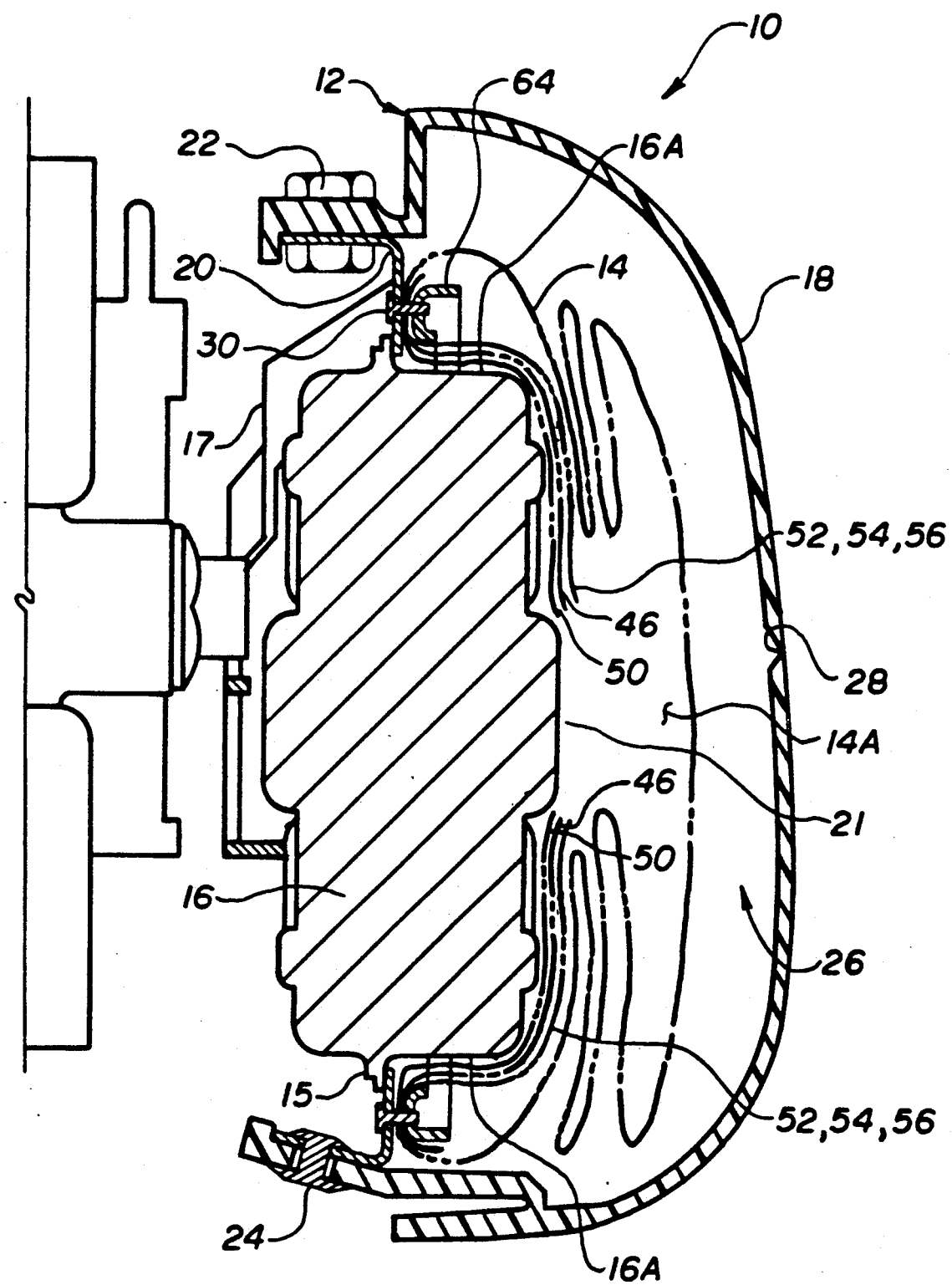
FIG. 1 is a schematic, sectional view of an air bag assembly constructed according to the principles of the present invention, in a condition prior to inflation of the air bag.
Figure 2:
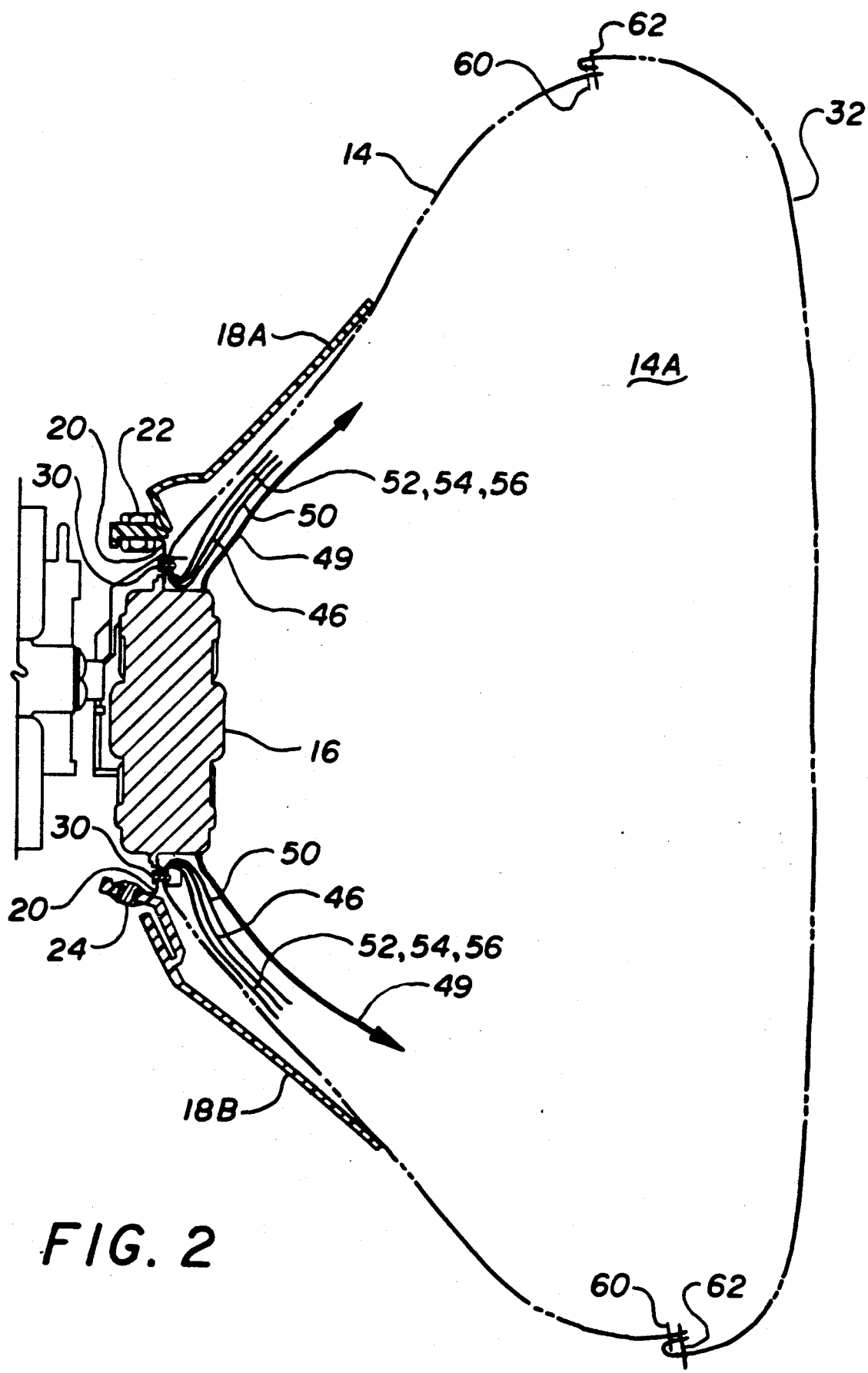
FIG. 2 is a fragmentary, schematic, sectional view of the air bag assembly during inflation of the air bag.

In FIGS. 1 and 2, a driver side air bag assembly 10 comprises a container 12, an air bag 14 constructed according to the present invention disposed in the container, and an inflator 16 extending partly into the container. The container 12 comprises a cover 18 attached to a reaction plate 20 by bolts 22 and rivets 24. The cover 18 and the reaction plate 20 cooperate to define a cavity 26. The air bag 14 is stored in the cavity in a collapsed, folded condition. The cover 18 is formed of a tough, flexible plastic such as urethane or a thermoplastic polyolefin (TPO) elastomer. The inside of the cover 18 has one or more V-shaped grooves 28, which create a designed weakness in the cover, to enable the cover 18 to separate into segments 18A, 18B as the air bag is deployed (see FIG. 2). The air bag 14 is attached to the reaction plate 20 by fasteners such as rivets 30, as described more fully hereinafter.

The inflator 16 has a generally cylindrical shape with an annular gas dispensing portion 16A including an array of gas dispensing nozzles (not shown), as is well known in the art. The inflator 16 can have any of a number of known constructions, including the construction of U.S. Pat. No. 4,902,036, which is a preferred construction. The inflator 16 is coupled to the reaction plate 20 by rivets (not shown) which fasten a peripheral flange 15 on the inflator 16 to the reaction plate. The air bag assembly 10 can be assembled outside of the vehicle, and then loaded as a unit into a cup-shaped base member 17 which is fixed to and rotatable with a vehicle steering shaft. The air bag assembly can be fastened to the cup-shaped base member 17 by suitable fastening structure (not shown), as will be readily apparent to those in the art.

At the onset of a vehicle collision, the inflator 16 is actuated and rapidly discharges an inert, nontoxic gas (e.g., nitrogen). The gas is directed, under pressure (and some heat), through the nozzles in the annular gas dispensing portion 16A. Since the gas dispensing portion 16A of the inflator is located in the gas inlet opening 21, the gas directed from the nozzles in the gas dispensing portion 16A is received in the gas inlet opening 21 and directed into an interior cavity 14A in the air bag. The gas begins to inflate the air bag 14 which applies pressure to the cover 18 (FIG. 1). Such pressure forces the air bag 14 through the cover 18 and inflates the air bag 14 to a predetermined configuration (FIG. 2). According to the present invention, the air bag 14 is preferably inflated to a configuration which approximates the shape of an ellipsoid. When inflated to its predetermined configuration, the air bag 14 acts as a cushion which absorbs energy and retards forward movement of a vehicle occupant who is being pitched forward by the force of a collision.

Figure 3:
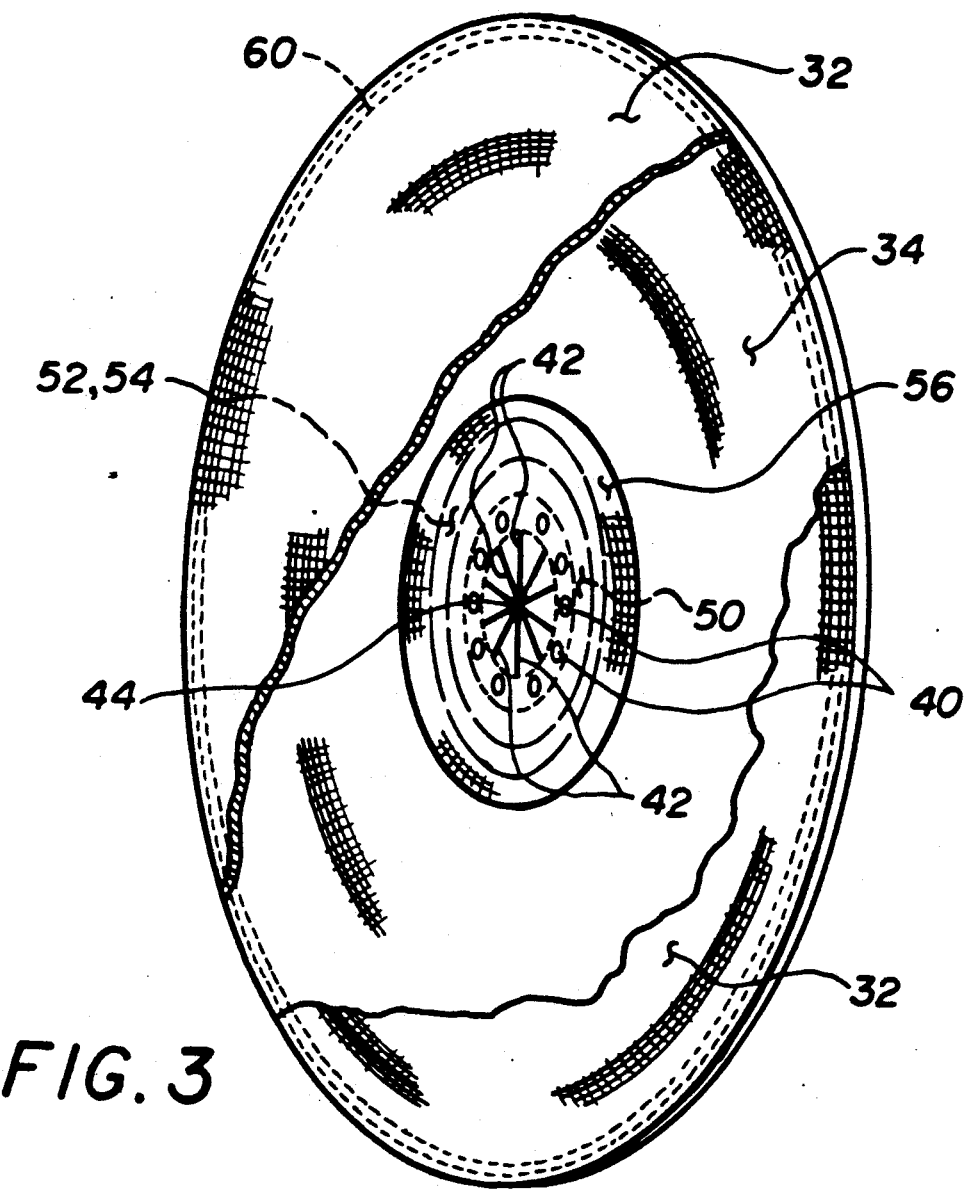
FIG. 3 is a schematic perspective view of a pair of panels for forming an air bag according to the invention, during an intermediate stage in the formation of the air bag, and with a portion broken away.
Figure 4:
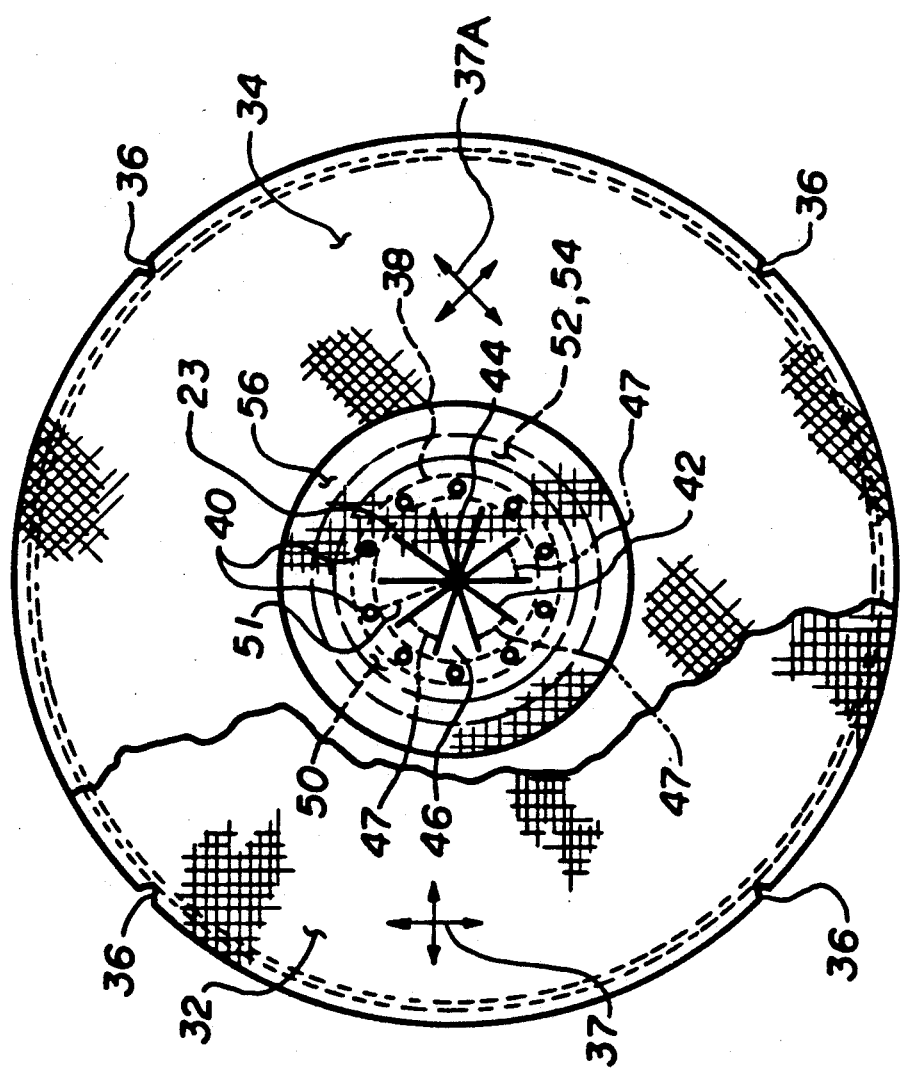
FIG. 4 is a front plan view of an air bag according to the invention, with a portion broken away, and illustrating the air bag in a completed condition.
Figure 5:
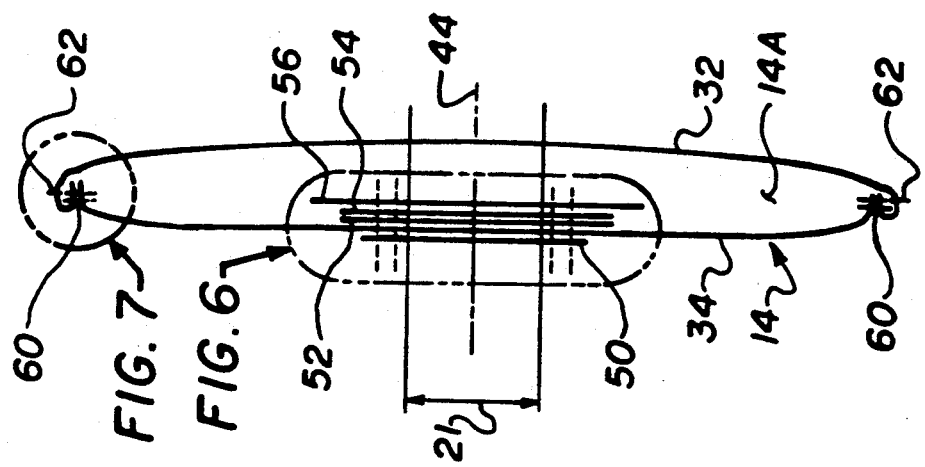
FIG. 5 is a schematic, sectional view of the air bag of FIG. 4.

The air bag 14 comprises a front panel 32 and a rear panel 34 attached together at their respective perimeters (see FIGS. 2, 3, 5). Each of the front and rear panels is preferably circular in shape and is formed from a woven synthetic material such as nylon. Notches 36 in the perimeters of each of the front and rear panels 32, 34 aid in aligning the panels so that the weave patterns 37, 37A of the front and rear panels, respectively, are in a transverse relationship to each other (see FIG. 4). Certain of the surfaces of the front and rear panels 32, 34 may also be coated with a heat resistant material such as neoprene, a synthetic rubber, to withstand better any heat that may be generated by the inflator during inflation.

Figure 6:
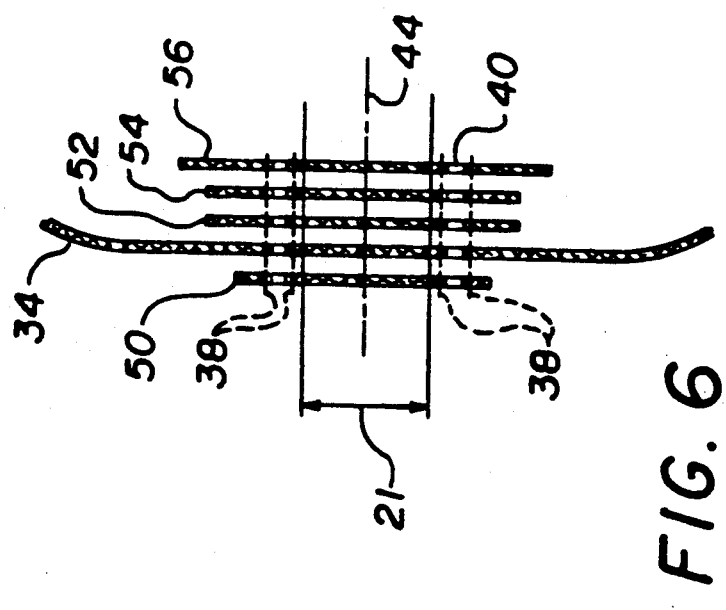
FIGS. 6 and 7 are enlarged views of the areas of the air bag of FIG. 5 identified at 6 and 7, respectively.

Located near the center of the rear panel 34 are fabric segments 50, 52 and 54 which overlie the portion of the air bag 14 around the gas inlet opening 21 (see FIGS. 4, 5, 6). Also, in the illustrated embodiment, an additional fabric segment 56 may be optionally provided, as discussed more fully below. In the preferred embodiment, the fabric segments 50, 52, 54 and 56 are circular and each of the fabric segments circumscribes a central axis 44 of the gas inlet opening 21. The fabric segments are fastened to the rear panel 34 by concentric seams 38. A plurality of mounting holes 40 and intersecting slits 42 are thereafter punched or cut through the fabric segments and the rear panel 34. The mounting holes 40 are arranged in a circular array between the concentric seams 38. The intersecting slits 42 extend diametrically inward in relation to an annular base 23 of fabric which is formed in part of the rear panel 34 and which is disposed radially inside the concentric seams 38. The annular base 23 defines the fluid inlet opening 21 and the slits 42 extend radially inward from the annular base 23. The mounting holes 40 enable the air bag 14 to be fastened to the reaction plate 20.

In the illustrated embodiment, five intersecting slits 42 are punched or cut through the center of the rear panel 34 and the fabric segments 50, 52, 54 and 56, which are fastened to the rear panel 34. The five slits all intersect at the central axis 44. The slits form generally triangular deflectable flaps 46 which extend radially inward from the base 23. The number of flaps may vary with different embodiments of the present invention, depending on the number of intersecting slits punched or cut through the rear panel of the air bag. Moreover, certain of the flaps may be removed should mounting or other considerations require their removal. For example, it is contemplated that the radially inner portions of certain flaps may be cut away along lines illustrated schematically by the phantom lines 47 in FIG. 4.

Each of the flaps 46 has a distal portion 48 near the central axis 44. The flaps 46 overlie the annular gas dispensing portion 16A of the inflator 16 when the inflator is not activated (see FIG. 1). When the inflator 16 is activated, gas is directed through the nozzles in the gas dispensing portion 16A of the inflator. Since the gas dispensing portion 16A is located in the fluid inlet opening 21, the gas directed from the nozzles in the gas dispensing portion 16A is received in the fluid inlet opening 21 and directed into the cavity 14A, the flaps 46 are blown axially into the interior cavity 14A of the air bag, and radially outward with respect to the central axis 44. Moreover, the flaps 46 formed from the fabric segment 50, which is proximate to the inflator 16, serve to redirect gases from the inflator nozzles, as illustrated schematically by the arrow 49 in FIG. 2.

Figure 8:
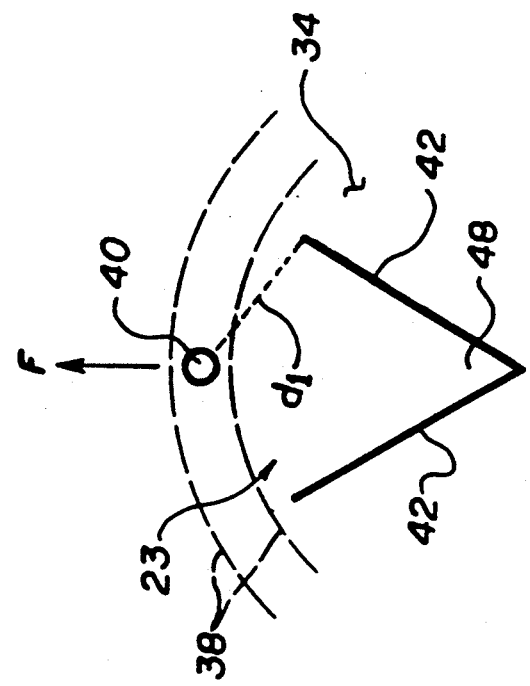
FIG. 8 is a schematic illustration of the geometric relationship of a deflectable flap and an associated mounting hole, in an air bag according to the invention.

The mounting holes 40 are spaced circumferentially around the perimeter of the fluid inlet opening 21 at predetermined distances from each other. Each of the mounting holes 40 is positioned radially outward from the base portion 23 and equidistant from the radially extending, intersecting edges of an adjacent flap 46. The edges of the triangular flap 46 are formed by the slits 42 which also create the flap. Thus, the mounting holes are located along radii 51 which extend from the central axis 44 and bisect each of the flaps 46 (see FIG. 4). Also, the distance $d_1$ (see FIG. 8) from an edge of the flap to the edge of the mounting hole is the shortest distance over which the fabric must tear in order to tear away from the reaction plate. Thus, if a force F is applied to the fabric surrounding a mounting hole 40 (FIG. 8), the fabric must tear at least over the distance $d_1$ before it tears away from the reaction plate. Accordingly, for a given size air bag, locating the mounting holes 40 in the manner disclosed is believed to maximize the distance over which the air bag must tear, in order to tear away from the reaction plate at the mounting holes 40.

In constructing an air bag according to the principles of this invention, the fabric segments 50, 52, 54 (and 56 when that segment is used) are sewn to the rear panel 34. The fabric segments 50, 52, and 54 are each formed of a neoprene coated nylon of a type similar to the material used to form the rear panel 34. As with the rear panel 34, the fabric segments 50, 52, and 54 are each coated on one side with neoprene, as described more fully hereinafter. The fabric segment 56, when used, can be formed of a thinner nylon coated on both sides with neoprene. Thus, whereas the fabric segment 50 provides both reinforcement and heat resistance, the fabric segment 56 primarily provides heat resistance. Alternatively, the fabric segment 56 may be formed of another heat resistant material (e.g., a material such as Nomex ® or Kevlar ® fabric). Both Nomex ® and Kevlar ® fabrics are registered trademarks of the E.I. Dupont de Nemours & Company for aramid fabrics. Both Nomex ® and Kevlar ® are relatively strong, flame retardant materials known for their heat resistivity.

Figure 7:
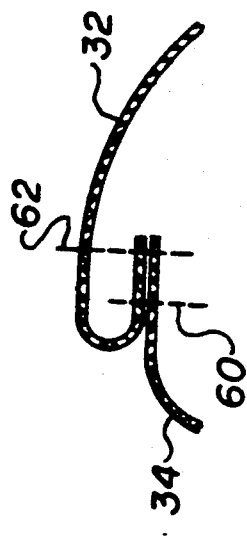

In constructing an air bag according to the principles of this invention, the fabric segments 50, 52, 54 (and 56 when used) are sewn to the rear panel 54 by the concentric seams 38. The fabric segment 50 is located on one side of the rear panel 34. The segments 52, 54 and 56 are located on the other side of the rear panel 34. The slits 42 and the mounting holes 40 are then simultaneously cut in the rear panel 34 and the fabric segments 50, 52, 54 and 56, thereby simultaneously forming the mounting holes 40 and the fluid inlet opening 21 in the rear panel 34 and in the fabric segments 50, 52, 54 and 56. Next, the outer perimeters of the front and rear panels 32 and 34 are overlapped and sewn to each other along outer seams 60, 62 (see FIGS. 3, 7). Specifically, the seam 60 is sewn through the two panels 32, 34. The front panel 32 is then pulled back over the seam 60 and the three overlapped portions of panels 32, 34 are sewn together along the seam 62. The rear panel 34 and the panels 50, 52 and 54 are oriented so that (i) the neoprene coating on the rear panel 34 is on the side of the panel presented to the inside of the air bag (i.e., the right side of the panel 34 in FIG. 6), (ii) the neoprene coating is on the outside surface of panel 50 (i.e., the left side of panel 50 in FIG. 6), and (iii) the neoprene coating is on the inside of panels 52, 54 (i.e., on the right side of the panels 52, 54 in FIG. 6).

Next, the air bag 14 is attached to the reaction plate 20. Specifically, the reaction plate 20 has a circular array of openings (not shown) which are located on a circle so that they can be aligned with the mounting holes 40 in the rear panel 34. An annular metal retainer ring 64, disposed inside the air bag 14, also has a circular array of openings. The openings in the retainer ring 64 are aligned with the openings in the reaction plate and the mounting holes 40 in the air bag. The fasteners 30 are driven through the mounting holes 40 and the aligned openings in the reaction plate 30 and the retainer ring 64 to fasten those members together.

With the foregoing structure, when the inflator 16 is secured to the reaction plate 20, the flaps in the rear panel 32 and the fabric segments 50, 52, 54 (and 56 when used) overlie the inflator (see FIG. 1). The outside surface of the fabric segment 50, on which the heat resistant neoprene coating is applied, is directly exposed to (and in most cases in contact with) the inflator 16. During inflation of the air bag, the deflectable flaps 46, and the flaps formed in the fabric segments 50, 52, 54 (and 56) are forced radially outward with respect to the central axis 44 of the gas inlet opening 21. The heat resistant neoprene coating on the fabric segment 50 protects the fabric segments 52, 54, the flaps 46 in the rear panel, and the concentric seams 38 from heat damage throughout the operation of the inflator (See FIG. 2). Moreover, when the special heat resistant fabric segment 56 is provided, the segment 56 provides additional heat protection to the rear panel, and the concentric seams 38 during operation of the inflator 16.

Thus, with the foregoing structure the geometry of the fluid inlet opening, the mounting holes 40 and the deflectable flaps 46 provide a significant degree of physical resistance to the air bag being torn away from the reaction plate during deployment of the air bag. Moreover, the fabric segments 50, 52, 54 and 56 provide additional resistance to the air bag being torn away from the reaction plate. The seams 38, which are radially inward of the mounting holes 40, provide yet additional resistance to the air bag being torn from the reaction plate during deployment of the air bag. The heat resistant outer coating on the fabric segment 50 (and the special heat resistant fabric 56, when used) deflects the gas directed from the inflator, and otherwise protects the air bag material, the fabric layers 52, 54, the concentric seams 38 and the mounting holes 40 from heat and pressure during deployment of the air bag. Accordingly, the foregoing components and design of the air bag cooperate to resist tearing of the air bag away from the reaction plate during deployment of the air bag.

Figure 9:
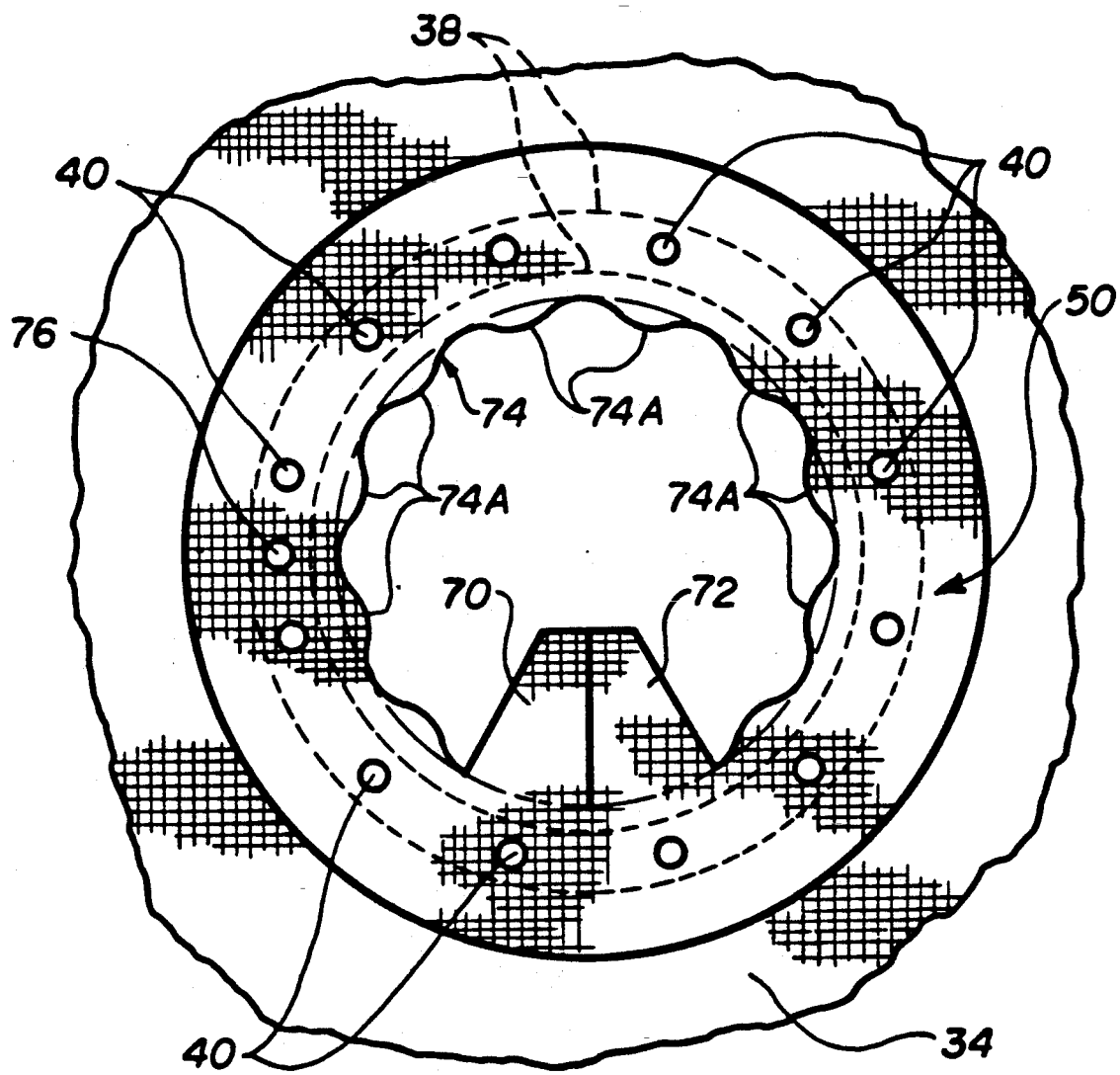
FIG. 9 is a fragmentary, schematic illustration of another form of fluid inlet opening for an air bag according to a modified form of the invention.

FIG. 9 schematically illustrates another form of fluid inlet opening for an air bag according to the principles of this invention. The air bag of FIG. 9 is intended to have a rear panel 34, concentric seams 38, mounting holes 40 and fabric segments 50, 52, 54 (and 56) which overlie each other in the manner shown in FIG. 6. (Note that FIG. 9 is taken from the outside of the air bag.) However, the pattern cut through the fabric segments and the rear panel 34 produces a different fluid inlet opening. Specifically, the fabric segments and the rear panel are cut so that only two deflectable flaps 70, 72 are formed in all of the segments and the rear panel. The flaps 70, 72 are located at specific sites about the perimeter of the fluid inlet opening. The remainder of the fluid inlet opening has an inner edge 74 with a wave form. The inner edge 74 is cut so that the crests 74A of the wave form are located along radii from the respective mounting holes 40. The flaps 70, 72 redirect gases at their specific sites and protect the rear panel, and the seams 38 from heat and pressure of the inflation gases. The wave form of the remainder of the fluid inlet opening provides a predetermined amount of tear resistance to the remainder of the fluid inlet opening. With a fluid inlet according to FIG. 9, an orientation hole 76 is necessary so that during assembly of the air bag with a reaction device the flaps 70, 72 will be properly located relative to the sites which need to be protected.

Figure 10:
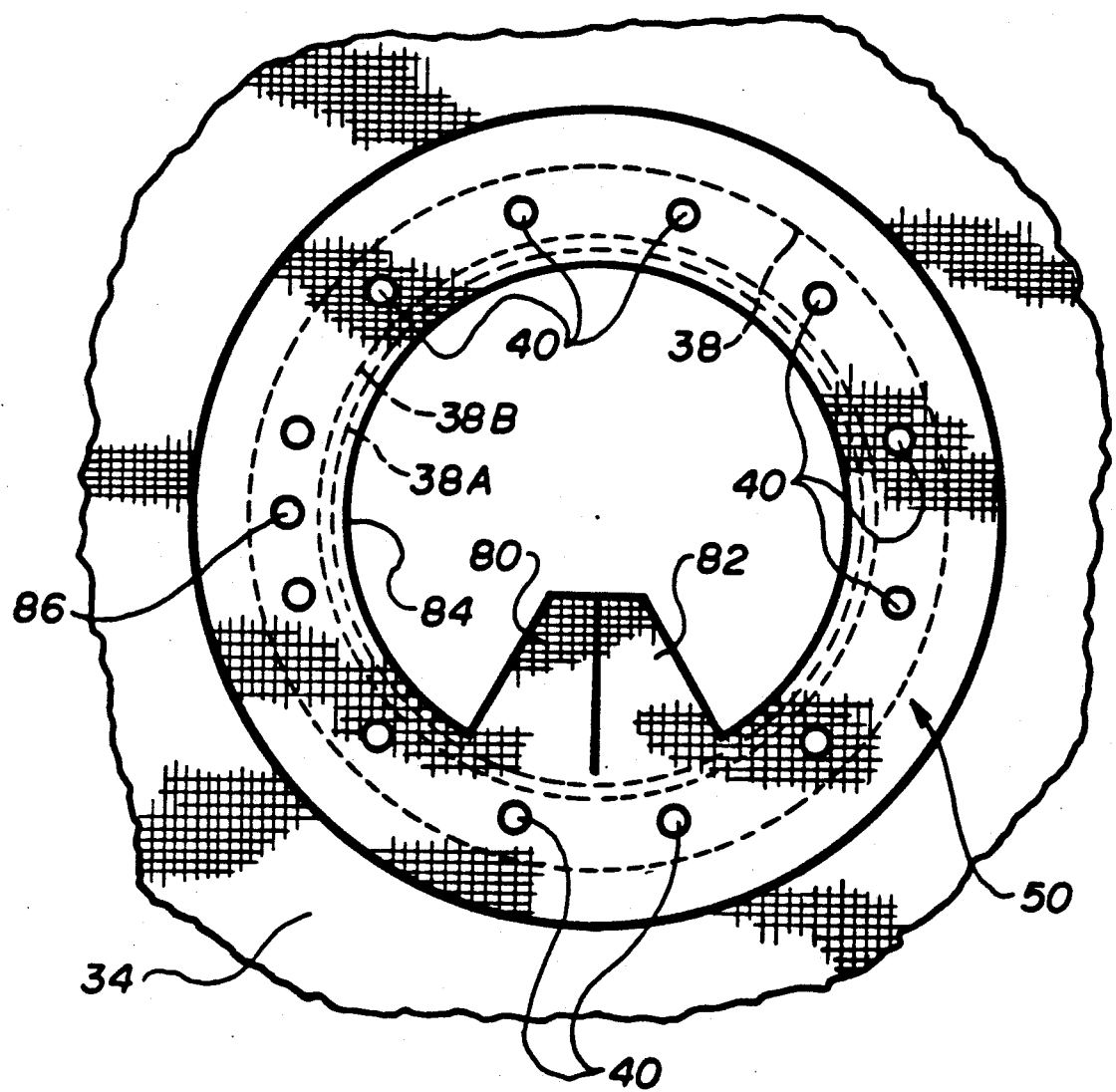
FIG. 10 is a fragmentary, schematic illustration of yet another form of fluid inlet opening for an air bag according to yet another version of the invention.

The air bag of FIG. 10 is intended to have a rear panel 34, concentric seams 38, mounting holes 40 and fabric segments 50, 52, 54 and 56 which overlie each other in the manner shown in FIG. 6. (Note that FIG. 10 is also taken from the outside of the air bag.) However, the pattern cut through the fabric segments and the rear panel 34 produces a different fluid inlet opening. Specifically, the segments and the rear panel are cut so that (i) a pair of deflectable flaps 80, 82 are formed at specific locations in all of the segments and the rear panel, and (ii) the remainder of the fluid inlet opening is cut along an arc which has a diameter less than the outer diameter of the inflator associated with the air bag. As with the previous embodiment, the flaps 80, 82 are located at specific sites about the perimeter of the fluid inlet opening. The arcuate inner edge 84 is cut along a diameter which is radially inward of the mounting holes far enough to allow a double layer of seams 38A, 38B to be located radially inward of the mounting holes 40, thereby to increase the tear resistance of the fluid inlet opening. The flaps 80, 82 redirect gases at their specific sites and protect the rear panel, and the seams 38 from heat and pressure due to the inflation gases. Further, since the flaps 80, 82 must be located at specific sites, an orientation hole 86 is also employed.

The construction and method of forming the air bag structure according to the present invention has thus been described in its preferred form. However, with the present disclosure in mind, it is believed that obvious alternatives to the preferred embodiment, to achieve comparable advantages in other air bag structures, will become apparent to those of ordinary skill in the art.

I claim:

1. An inflatable air bag for use in a vehicle occupant restraint system,
   said air bag being formed of flexible material and having an interior fluid cavity into which fluid under heat and pressure can be directed to inflate said air bag,
   said air bag including a base portion of said flexible material which surrounds a central axis and which defines a gas inlet opening for receiving fluid into said interior cavity to inflate said air bag;
   said air bag also including a plurality of deflectable flaps which are formed from the flexible material, said flaps being disposed at predetermined locations about said gas inlet opening and being deflectable outward with respect to said central axis when fluid is directed against said deflectable flaps and into said interior cavity;
   said air bag further having mounting structure which enables said air bag to be attached to a portion of a vehicle occupant restraint system, said mounting structure being located in a portion of said flexible material which surrounds said central axis and which is located outward of said base portion of said flexible material;
   said air bag further including (i) reinforcement structure which reinforces said base portion, said deflectable flaps and said mounting structure, and (ii) heat protection structure which protects said base portion, said deflectable flaps, said mounting structure and said reinforcement structure from the heat of the fluid which is directed into the fluid cavity to inflate the air bag; and
   each of said deflectable flaps extending inward from the base portion toward the central axis a sufficient distance such that when deflected outward with respect to said central axis said deflectable flaps and said heat protection structure associated therewith covers a selected portion of said mounting structure.

2. Apparatus as set forth in claim 1, wherein said base portion of flexible material circumscribes said central axis, and each of said deflectable flaps has a pair of edges extending radially inward from spaced apart locations on said base portion of said flexible material.

3. Apparatus as set forth in claim 2, wherein said mounting structure comprises a plurality of mounting holes formed in said flexible material, each mounting hole being located radially outward from a respective one of said deflectable flaps and about equidistant from the edges of the respective one of said deflectable flaps.

4. Apparatus as set forth in claim 3, wherein said air bag comprises front and rear panels each of which is formed of flexible material, said front and rear panels having peripheral edges which are joined together to form said inflatable air bag, said gas inlet opening and said mounting holes being formed in said rear panel.

5. Apparatus as set forth in claim 4, wherein said plurality of deflectable flaps are formed by one or more slits in said rear panel.

6. Apparatus as set forth in claim 5, wherein said plurality of flaps are formed by a plurality of slits extending diametrically with respect to said base portion and intersect each other at about said central axis.

7. Apparatus as set forth in claim 4, wherein said plurality of slits are formed at localized sites about the gas inlet opening and the remainder of the gas inlet opening has an inner edge having a predetermined configuration.

8. Apparatus as set forth in either of claims 6 or 7, wherein said reinforcement structure comprises segments of flexible reinforcement material attached to opposite sides of said rear panel by means of concentric seams which surround said central axis, said segments of reinforcement material having (i) flaps which overlie said deflectable flaps and (ii) a base portion which overlies the base portion of said flexible material and extends radially outward therefrom, said base portion of said reinforcement member having mounting holes which are located between said concentric seams and aligned with the mounting holes in said rear panel.

9. Apparatus as set forth in claim 8, wherein said heat protection structure comprises a coating of heat resistant material on at least one of said segments of flexible reinforcement material.

10. Apparatus as set forth in claim 8, wherein at least a pair of seams are located radially inward of said mounting holes to increase the tear resistance of said fluid inlet opening.

11. A vehicle occupant restraint system comprising:
a storage device, an inflatable air bag disposed in said storage device, and a fluid source for use in inflating said air bag, said fluid source having a gas dispensing portion provided with gas dispensing nozzles;
said air bag being formed of flexible material and having an interior fluid cavity;
said air bag being designed to be forced out of said storage device and inflated to a predetermined configuration when gas under heat and pressure is directed from said fluid source into said interior cavity;
a gas inlet opening formed in said flexible material and designed to enable gas under pressure to be directed into said interior cavity to inflate said air bag to its predetermined configuration;
said gas inlet opening being defined by a base portion of said flexible material which surrounds a central axis and a plurality of deflectable flaps which are formed from the flexible material and extend inward from said base portion, toward said central axis, said deflectable flaps at least partially covering said gas dispensing nozzles of said fluid source, said deflectable flaps being disposed at predetermined locations about said gas inlet opening and being deflectable outward with respect to said central axis when gas under pressure is directed against said deflectable flaps and into said interior cavity;
mounting structure which attaches said air bag to a portion of said storage device, said mounting structure being located in a portion of said flexible material which surrounds said central axis and which is located outward of said base portion of said flexible material;
said air bag further including (i) reinforcement structure which reinforces said base portion, said deflectable flaps and said mounting structure, and (ii) heat protection structure which protects said base portion, said deflectable flaps, said mounting structure and said reinforcement structure from the heat of the fluid which is directed into the fluid cavity to inflate the air bag, and
each of said deflectable flaps extending inward from the base portion toward the central axis a sufficient distance such that when deflected outward with respect to said central axis said deflectable flaps and said heat protection structure associated therewith covers a selected portion of said mounting structure.

12. A vehicle occupant restraint system as set forth in claim 11, wherein said base portion of said flexible material circumscribes said central axis, and each of said deflectable flaps has a pair of edges extending radially inward from spaced apart locations on said base portion of said flexible material.

13. A vehicle occupant restraint system as set forth in claim 12, wherein said mounting structure comprises:
a plurality of mounting holes formed in said flexible material each mounting hole being located radially outward from a respective one of said deflectable flaps and about equidistant from the edges of the respective one of said deflectable flaps; and
a plurality of fasteners each of which extends through a respective mounting hole and couples a respective part of said flexible material to said portion of said storage device.

14. A vehicle occupant restraint system as set forth in claim 13, wherein said air bag comprises front and rear panels each of which is formed of flexible material, said front and rear panels having peripheral edges which are joined together to form said inflatable air bag, said gas inlet opening and said mounting holes being formed in said rear panel.

15. A vehicle occupant restraint system as set forth in claim 14, wherein said plurality of deflectable flaps are formed by a plurality of slits in said rear panel.

16. A vehicle occupant restraint system as set forth in claim 15, wherein said slits extend diametrically with respect to said base portion and intersect each other at about said central axis.

17. A vehicle occupant restraint system as set forth in claim 14, wherein said plurality of slits are formed at localized sites about the gas inlet opening and the remainder of the gas inlet opening has an inner edge having a predetermined configuration.

18. A vehicle occupant restraint system as set forth in any of claims 13, 14 or 15, wherein said reinforcement structure comprises segments of flexible reinforcement material attached to opposite sides of said rear panel by means of concentric seams which surround said central axis, said segments of reinforcement material having (i) flaps which overlie said deflectable flaps and (ii) a base portion which overlies the base portion of said flexible material and extends radially outward therefrom, said base portion of said reinforcement member having mounting holes which are located between said concentric seams and aligned with the mounting holes in said rear panel.

19. A vehicle occupant restraint system as set forth in claim 18, wherein said heat protection structure comprises a coating of heat resistant material on at least one of said segments of flexible reinforcement material.

20. A vehicle occupant restraint system as set forth in claim 18, wherein at least a pair of seams are located radially inward of said mounting holes to increase the tear resistance of said fluid inlet opening.

21. A method of forming a vehicle air bag, comprising the steps of:
   providing a rear panel formed of flexible material;
   attaching a segment of flexible reinforcement material and a segment of heat resistant material to opposite sides of a base portion of said rear panel;
   providing a front panel formed of flexible material;
   forming in said portion of said rear panel and the segments of reinforcement material and heat resistant material on the opposite sides thereof a fluid inlet opening defined by a base portion of said rear panel which surrounds a central axis;
   forming in said rear panel and the segments of reinforcement material and heat resistant material on the opposite sides thereof a plurality of mounting holes disposed around the perimeter of said fluid inlet opening, each of said plurality of mounting holes being positioned radially outward from said flaps; and
   fastening said rear panel to said front panel to complete an inflatable air bag with an interior cavity, said inflatable bag being inflatable by fluid directed through said fluid inlet opening and into said interior cavity so as to restrain a vehicle occupant in an emergency situation;
   wherein said step of forming said fluid inlet opening comprises the step of forming a plurality of flaps which extend inward from the base portion toward the central axis a sufficient distance such that when deflected outward with respect to the central axis the flaps and portions of the heat restraint material associated therewith cover the mounting holes.

22. An inflatable air bag for use in a vehicle occupant restraint system;
   said air bag being formed of flexible material and having an interior fluid cavity into which fluid under heat and pressure can be directed to inflate said air bag;
   said air bag including a base portion of said flexible material which surrounds a central axis and which defines a gas inlet opening for receiving fluid into said interior cavity to inflate said air bag;
   said air bag also including a plurality of deflectable flaps which are formed from the flexible material, each of said deflectable flaps having a pair of edges extending radially inward from spaced apart locations on said base portion toward said central axis whereby said flaps are disposed at predetermined locations about said gas inlet opening, said flaps being deflectable outward with respect to said central axis when fluid is directed against said deflectable flaps and into said interior cavity;
   said air bag further having mounting structure which enables said air bag to be attached to a portion of a vehicle occupant restraint system, said mounting structure comprising a plurality of mounting holes formed in a portion of said flexible material which surrounds said central axis and which is located outward of said base portion of said flexible material, each mounting hole being located radially outward from a respective one of said deflectable flaps and about equidistant from the edges of the respective one of said deflectable flaps;
   said air bag further including (i) reinforcement structure which reinforces said base portion, said deflectable flaps and said mounting structure, and (ii) heat protection structure which protects said base portion, said deflectable flaps, said mounting structure and said reinforcement structure from the heat of the fluid which is directed into the fluid cavity to inflate the air bag;
   said air bag comprising front and rear panels each of which is formed of flexible material, said front and rear panels having peripheral edges which are joined together to form said inflatable air bag, said gas inlet opening and said mounting holes being formed in said rear panel; and
   said plurality of deflectable flaps being formed by one or more slits in said rear panel at localized sites about the gas inlet opening, the remainder of the gas inlet opening having an inner edge with an arcuate configuration.

23. An inflatable air bag for use in a vehicle occupant restraint system;
   said air bag being formed of flexible material and having an interior fluid cavity into which fluid under heat and pressure can be directed to inflate said air bag;
   said air bag including a base portion of said flexible material which surrounds a central axis and which defines a gas inlet opening for receiving fluid into said interior cavity to inflate said air bag;
   said air bag also including a plurality of deflectable flaps which are formed from the flexible material, each of said deflectable flaps having a pair of edges extending radially inward from spaced apart locations on said base portion toward said central axis whereby said flaps are disposed at predetermined locations about said gas inlet opening, said flaps being deflectable outward with respect to said central axis when fluid is directed against said deflectable flaps and into said interior cavity;
   said air bag further having mounting structure which enables said air bag to be attached to a portion of a vehicle occupant restraint system, said mounting structure comprising a plurality of mounting holes formed in a portion of said flexible material which surrounds said central axis and which is located outward of said base portion, each mounting hole being located radially outward from a respective one of said deflectable flaps and about equidistant from the edges of the respective one of said deflectable flaps;
   said air bag further including (i) reinforcement structure said air bag comprising front and rear panels each of which is formed of flexible material, said front and rear panels having peripheral edges which are joined together to form said inflatable air bag, said gas inlet opening and said mounting holes being formed in said rear panel; and said plurality of deflectable flaps being formed by one or more slits in said rear panel at localized sites about the gas inlet opening, the remainder of the gas inlet opening having an inner edge with an arcuate configuration.

24. Apparatus as set forth in either of claims 22 or 23 wherein said reinforcement structure comprises segments of flexible reinforcement material attached to opposite sides of said rear panel by means of concentric seams which surround said central axis, said segments of reinforcement material having (i) flaps which overlie said deflectable flaps and (ii) a base portion which overlies the base portion of said flexible material and extends radially outward therefrom, said base portion of said reinforcement member having mounting holes which are located between said concentric seams and aligned with the mounting holes in said rear panel.

25. Apparatus as set forth in claim 24, wherein said heat protection structure comprises a coating of heat resistant material on at least one of said segments of flexible reinforcement material.

26. Apparatus as set forth in claim 24, wherein at least a pair of seams are located radially inward of said mounting holes to increase the tear resistance of said fluid inlet opening.

27. A vehicle occupant restraint system comprising a storage device, an inflatable air bag disposed in said storage device, and a fluid source for use in inflating said air bag; mounting structure which attaches said air bag to a portion of said storage device said air bag being formed of flexible material and having an interior fluid cavity;

said air bag being designed to be forced out of said storage device and inflated to a predetermined configuration when gas under heat and pressure is directed from said fluid source into said interior cavity;

a gas inlet opening formed in said flexible material and designed to enable gas under pressure to be directed into said interior cavity to inflate said air bag to its predetermined configuration;

said gas inlet opening being defined by a base portion of said flexible material which surrounds a central axis and a plurality of deflectable flaps which are formed from the flexible material and extend inward from said base portion, toward said central axis, said deflectable flaps being disposed at predetermined locations about said gas inlet opening and being deflectable outward with respect to said central axis when gas under pressure is directed against said deflectable flaps and into said interior cavity;

said mounting structure being located in a portion of said flexible material which surrounds said central axis and which is located outward of said base portion of said flexible material;

said air bag further including (i) reinforcement structure which reinforces said base portion, said deflectable flaps and said mounting structure, and (ii) heat protection structure which protects said base portion, said deflectable flaps, said mounting structure and said reinforcement structure from the heat of the fluid which is directed into the fluid cavity to inflate the air bag;

said base portion of said flexible material circumscribing said central axis, and each of said deflectable flaps having a pair of edges extending radially inward from spaced apart locations on said base portion of said flexible material;

said mounting structure comprising a plurality of mounting holes formed in said flexible material and a plurality of fasteners;

each mounting hole being located radially outward from a respective one of said deflectable flaps and about equidistant from the edges of the respective one of said deflectable flaps;

each fasteners extending through a respective mounting hole and couples a respective part of said flexible material to said portion of said storage device;

said air bag comprising front and rear panels each of which is formed of flexible material, said front and rear panels having peripheral edges which are joined together to form said inflatable air bag, said gas inlet opening and said mounting holes being formed in said rear panel;

said plurality of slits formed at localized sites about the gas inlet opening and the remainder of the gas inlet opening having an inner edge with a predetermined configuration;

said remainder of said gas inlet opening having an inner edge having an arcuate configuration.

28. A vehicle occupant restraint system as set forth in claim 27 wherein said reinforcement structure comprises segments of flexible reinforcement material attached to opposite sides of said rear panel by means of concentric seams which surround said central axis, said segments of reinforcement material having (i) flaps which overlie said deflectable flaps and (ii) a base portion which overlies the base portion of said flexible material and extends radially outward therefrom, said base portion of said reinforcement member having mounting holes which are located between said concentric seams and aligned with the mounting holes in said rear panel.

29. A vehicle occupant restraint system as set forth in claim 28, wherein said heat protection structure comprises a coating of heat resistant material on at least one of said segments of flexible reinforcement material.

30. A vehicle occupant restraint system as set forth in claim 28, wherein at least a pair of seams are located radially inward of said mounting holes to increase the tear resistance of said fluid inlet opening.

31. A vehicle occupant restraint system comprising a storage device, an inflatable air bag disposed in said storage device, and a fluid source for use in inflating said air bag; mounting structure which attached said air bag to a portion of said storage device said air bag being formed of flexible material and having an interior fluid cavity;

said air bag being designed to be forced out of said storage device and inflated to a predetermined configuration when gas under heat and pressure is directed from said fluid source into said interior cavity;

a gas inlet opening formed in said flexible material and designed to enable gas under pressure to be directed into said interior cavity to inflate said air bag to its predetermined configuration;

said gas inlet opening being defined by a base portion of said flexible material which surrounds a central axis and a plurality of deflectable flaps which are formed from the flexible material and extend inward from said base portion, toward said central axis, said deflectable flaps being disposed at predetermined locations about said gas inlet opening and being deflectable outward with respect to said central axis when gas under pressure is directed against said deflectable flaps and into said interior cavity;

said mounting structure being located in a portion of said flexible material which surrounds said central axis and which is located outward of said base portion of said flexible material;

said air bag further including (i) reinforcement structure which reinforces said base portion, said deflectable flaps and said mounting structure, and (ii) heat protection structure which protects said base portion, said deflectable flaps, said mounting structure and said reinforcement structure from the heat of the fluid which is directed into the fluid cavity to inflate the air bag;

said base portion of said flexible material circumscribing said central axis, and each of said deflectable flaps having a pair of edges extending radially inward from spaced apart locations on said base portion of said flexible material;

said mounting structure comprising a plurality of mounting holes formed in said flexible material and a plurality of fasteners;

each mounting hole being located radially outward from a respective one of said deflectable flaps and about equidistant from the edges of the respective one of said deflectable flaps;

each fasteners extending through a respective mounting hole and couples a respective part of said flexible material to said portion of said storage device;

said air bag comprising front and rear panels each of which is formed of flexible material, said front and rear panels having peripheral edges which are joined together to form said inflatable air bag, said gas inlet opening and said mounting holes being formed in said rear panel;

said plurality of slits formed at localized sites about the gas inlet opening and the remainder of the gas inlet opening having an inner edge with a predetermined configuration;

said remainder of said gas inlet opening having an inner edge having an arcuate configuration.

32. A vehicle occupant restraint system as set forth in claim 31 wherein said reinforcement structure comprises segments of flexible reinforcement material attached to opposite sides of said rear panel by means of concentric seams which surround said central axis, said segments of reinforcement material having (i) flaps which overlie said deflectable flaps and (ii) a base portion which overlies the base portion of said flexible material and extends radially outward therefrom, said base portion of said reinforcement member having mounting holes which are located between said concentric seams and aligned with the mounting holes in said rear panel.

33. A vehicle occupant restraint system as set forth in claim 32, wherein said heat protection structure comprises a coating of heat resistant material on at least one of said segments of flexible reinforcement material.

34. A vehicle occupant restraint system as set forth in claim 32, wherein at least a pair of seams are located radially inward of said mounting holes to increase the tear resistance of said fluid inlet opening.

35. A method of forming a vehicle air bag, comprising the steps of:

providing a rear panel formed of flexible material;

attaching a segment of flexible reinforcement material and a segment of heat resistant material to opposite sides of a portion of said rear panel;

providing a front panel formed of flexible material;

forming in said portion of said rear panel and the segments of reinforcement material and heat resistant material on the opposite sides thereof a fluid inlet opening defined by a base portion of said rear panel which surrounds a central axis and from which a plurality of flaps extending inward toward said central axis, each of said flaps having side edges which intersect said base portion at spaced apart locations, forming in said rear panel and the segments of reinforcement material and heat resistant material on the opposite sides thereof a plurality of mounting holes disposed around the perimeter of said fluid inlet opening, each of said plurality of mounting holes being positioned radially outward from said flaps; and fastening said rear panel to said front panel to complete an inflatable air bag with an interior cavity, said inflatable bag being inflatable by fluid directed through said fluid inlet opening and into said interior cavity so as to restrain a vehicle occupant in an emergency situation;

wherein said step of forming said fluid inlet opening includes the step of forming a plurality of intersecting slits in said rear panel;

wherein said plurality of slits and said plurality of mounting holes are simultaneously formed in said rear panel and the segments of reinforcement material and heat resistant material on the opposite sides thereof.

36. A method as set forth in claim 35, wherein said rear panel, and said segments of reinforcement and heat resistant material each comprises flexible material, and said step of fastening said segments of reinforcement and heat resistant material to said rear panel comprises sewing said segments of reinforcement and heat resistant material to said rear panel by means of concentric seams, and said step of forming said mounting holes comprises the step of forming said mounting holes between said concentric seams.

37. A method as set forth in claim 36, wherein said step of fastening said segments of reinforcement and heat resistant material to said rear panel comprises sewing a plurality of seams radially inward of said mounting holes.

38. A method of forming a vehicle air bag, comprising the steps of:

providing a rear panel formed of flexible material;

attaching a segment of flexible reinforcement material and a segment of heat resistant material to opposite sides of a portion of said rear panel;

providing a front panel formed of flexible material;

forming in said portion of said rear panel and the segments of reinforcement material and heat resistant material on the opposite sides thereof a fluid inlet opening defined by a base portion of said rear panel which surrounds a central axis and from which a plurality of flaps extending inward toward said central axis, each of said flaps having side edges which intersect said base portion at spaced apart locations, forming in said rear panel and the segments of reinforcement material and heat resistant material on the opposite sides thereof a plurality of mounting holes disposed around the perimeter of said fluid inlet opening, each of said plurality of mounting holes being positioned radially outward from said flaps; and fastening said rear panel to said front panel to complete an inflatable air bag with an interior cavity, said inflatable bag being inflatable by fluid directed through said fluid inlet opening and into said interior cavity so as to restrain a vehicle occupant in an emergency situation;

wherein said step of forming said fluid inlet opening includes the step of forming a plurality of intersecting slits in said rear panel and the segments of reinforcement material and heat resistant material on the opposite sides thereof, said slits extending diametrically with respect to said base portion and defining the side edges of said deflectable flaps, and forming said mounting holes at locations which are substantially equidistant from the side edges of said deflectable flaps.

39. A method as set forth in claim 38 wherein said plurality of slits and said plurality of mounting holes are simultaneously formed in said rear panel and the segments of reinforcement material and heat resistant material on the opposite sides thereof.

40. A method as set forth in claim 39, wherein said rear panel, and said segments of reinforcement and heat resistant material each comprises flexible fabric material, and said step of fastening said segments of reinforcement and heat resistant material to said rear panel comprises sewing said segments of reinforcement and heat resistant material to said rear panel by means of concentric seams, and said step of forming said mounting holes comprises the step of forming said mounting holes between said concentric seams.

41. A method as set forth in claim 40, wherein said step of fastening said segments of reinforcement and heat resistant material to said rear panel comprises sewing a plurality of seams radially inward of said mounting holes.

* * * * *

UNITED STATES PATENT AND TRADEMARK OFFICE
CERTIFICATE OF CORRECTION

PATENT NO. : 5,226,671

DATED : July 13, 1993

INVENTOR(S) : Bruce R. Hill

It is certified that error appears in the above-identified patent and that said Letters Patent is hereby corrected as shown below:

At column 11, line 52, "restraint" should be -- resistant--.

At column 11, line 61, "surrounds" should be -- circumscribes --.

At column 12, line 43, "surrounds" should be -- circumscribes --;

column 12, line 68 should read: ture -- which reinforces said base portion, said deflectable flaps and said mounting structure, and (ii) heat protection structure which protects said base portion, said deflectable flaps, said mounting structure and said reinforcement structure from the heat of the fluid which is directed into the fluid cavity to inflate the air bag; --.

At column 13, line 11, "arcuate" should be -- waveform --.

At column 14, line 24, before "formed" insert -- being --.

UNITED STATES PATENT AND TRADEMARK OFFICE
CERTIFICATE OF CORRECTION

PATENT NO. : 5,226,671

DATED : July 13, 1993

INVENTOR(S) : Bruce R. Hill

It is certified that error appears in the above-identified patent and that said Letters Patent is hereby corrected as shown below:

At column 14, line 26, "having" should be -- has --; "with" should be -- having --.

At column 15, line 44, before "formed" insert -- being --.

At column 15, line 46, "having" should be -- has --; "with" should be -- having --.

At column 15, line 49, "arcuate" should be -- with a waveform --.

At column 16, line 42, after "flexible" insert -- fabric --.

Signed and Sealed this

Twenty-sixth Day of April, 1994

BRUCE LEHMAN

*Attest:*

*Attesting Officer*  *Commissioner of Patents and Trademarks*